Patented Nov. 4, 1947

2,430,342

UNITED STATES PATENT OFFICE 2,430,342

FUNGICIDE COMPOSITIONS

John Franklin Kagy, Long Beach, and Kenneth D. Sloop, Yorba Linda, Calif., assignors to The Dow Chemical Company, Midland, Mich., a corporation of Delaware No Drawing. Application June 10, 1944,
Serial No. 539,784

9 Claims. (Cl. 167—30)

This invention relates to fungicides and is particularly directed to improved agricultural fungicide compositions and a method for their preparation.

The compound chloranil has been widely publicized as a fungicidal toxicant and is currently employed as a dust in the treatment of seeds. The use of this toxicant as a general agricultural fungicide for inclusion in spray compositions has been restricted by the limited amounts of the compound available and the problems involved in obtaining effective deposits of toxicant on plant surfaces when operating in accordance with conventional spray practice.

In an effort to overcome problems of deposit, contact, and sticking, it has been suggested to include various wetting, dispersing, and emulsifying agents in aqueous suspensions of chloranil. While this has operated to provide more stable spray mixtures, the deposit of toxicant has not been materially improved. In fact the use of an excess of many wetting and dispersing agents materially decreases the deposit of toxicant by favoring run-off of the latter along with the aqueous carrier.

A further suggestion of doubtful merit has been to introduce the chloranil in finely-divided form into oil emulsion sprays to utilize the oil both as carrier and as sticking agent. This has been found entirely impractical, since the addition of chloranil to either emulsion concentrates or aqueous dilutions thereof results in the breaking or inverting of the emulsion, whereby the chloranil and oil separate out as a cheesy mass upon the inner surfaces of containers and spray tanks. Also such inversion causes plugging of spray lines and nozzles whereby, regardless of the degree of agitation, a satisfactory application and deposit of the chloranil is not obtained.

It is among the objects of the present invention to provide a method for the preparation of aqueous spray mixtures containing chloranil as an active toxicant and adapted to be employed for general agricultural fungicidal purposes. It is a further object to provide means whereby oil and chloranil may be used together in aqueous spray compositions. Another object is to provide means whereby oil and chloranil may be compounded together and later dispersed in an aqueous spray mixture. An additional object is the provision of chloranil concentrates adapted to be dispersed in water to form satisfactory spray mixtures. A still further object is the provision of aqueous dispersions of chloranil which on application to plant surfaces will give heavy deposits of chloranil, whereby minimum amounts of the latter are required to accomplish the control of fungus and related organisms. Other objects will become apparent from the following specification and claims.

We have discovered that an improved fungicide concentrate may be prepared by treating and intimately mixing finely-divided chloranil with from 0.5 to 3 per cent by weight of oil. The resulting fungicide concentrate is in the form of a dust adapted to be dispersed in water in the presence of a suitable wetting or emulsifying agent to form an aqueous spray composition from which the oil and chloranil do not separate or "cheese-out" in the manner characterizing compositions prepared by adding chloranil to existing oil emulsions. Such improved aqueous composition may be sprayed upon plant surfaces to obtain heavy deposits of chloranil and oil which stick tightly to the surfaces of leaves, bark and fruit, whereby fungicidal control is accomplished with much smaller amounts of toxicant than when operating with simple aqueous dispersions of finely-divided chloranil.

A preferred composition and mode of operation includes the addition of small amounts of wetting, emulsifying, or dispersing agent to the chloranil-oil dust. Such concentrate may then be dispersed directly into the water without the necessity of adding wetting agents during the tank mix or other spray compounding operation.

In preparing the new compositions, the oil is atomized or sprayed onto the body of finely-divided chloranil with efficient mixing and agitation. The composition is then ready for use. Where it is desired to include the wetting or dispersing agent in the concentrate, such additament may be ground or mixed either with the chloranil or with the oil-coated chloranil as preferred.

The amounts of oil and wetting or dispersing agent employed are critical. When less than 0.5 per cent by weight of oil is used, a satisfactory deposit of chloranil out of aqueous dispersion is not obtained. When the amount of oil employed is substantially in excess of 3 per cent by weight, the concentrate is gummy and does not disperse well in water. The preferred proportion employed is between about 1.0 and 2.0 per cent by weight of the chloranil.

No definite limitation can be placed upon the exact amount of wetting agent to be employed either in the concentrate or in the water in which the concentrate is to be dispersed. However, it has been found that excesses must be avoided, due to the relatively poor deposits obtained when the aqueous dispersions are so stable as to favor a high loss of toxicant in the run-off following the spray application. The preferred amount of wetting or dispersing agent is the minimum amount required to accomplish dispersion of the oil-impregnated chloranil and varies with the particular wetting, dispersing, or emulsifying agent selected. When using 100 per cent sodium lauryl sulfate, the operable amounts vary from about 0.2 to 1.0 per cent by weight of the chloranil-oil. With various commercial preparations containing less than 100 per cent of sodium lauryl sulfate, the preferred amounts are from 0.5 to 2.0 per cent. With wetting, dispersing, and emulsifying compositions containing other agents as their effective ingredients, as much as 5 or 10 per cent or more may be required. Included in the group of materials which are satisfactory for use in accomplishing the dispersion of the oil-chloranil mixture are ammonium caseinate, blood albumen, bentonite, soaps, metal naphthenates, complex ether-esters, sulfuric acid derivatives of organic acids, alcohols, hydrocarbons, and phenols, and salts of the latter.

The amount of the dust concentrate employed in fungicide sprays is generally from about 0.25 to 3 pounds or more per 100 gallons depending on the climatic conditions and the particular organisms to be controlled. The amount of the aqueous dispersion applied to a given tree or plant to accomplish the control of fungus infection varies with the surface to be covered, the type of vegetation, and the concentration of the spray. From about 7 to 15 gallons per tree is generally adequate.

In a representative operation, 97.5 parts by weight of finely-divided chloranil (6–10 micron particle diameter) was placed in an efficient mechanical mixer and 2.0 parts by weight of petroleum oil atomized thereon with continual stirring and agitation. The oil had an A. P. I. gravity at 60° F. of 22.0, a Saybolt viscosity of 103 at 100° F., and an unsulfonatable residue value of 72–74 per cent. When all of the oil had been atomized, mixing was continued until a homogeneous product was obtained. 0.5 part by weight of sodium lauryl sulfate (IN–181–P) was then ground and mixed with the chloranil and oil to produce a dust concentrate in which the amount of wetting agent was the very minimum required to cause wetting and dispersion of the composition in water.

One pound of the foregoing concentrate is dispersed in 100 gallons of water and the resulting aqueous composition sprayed with continual stirring of the spray tank on orange trees at the rate of approximately 12 gallons per tree. As a result of this application, there is obtained a heavy deposit of chloranil on the branches and leaves of the trees, whereby a substantially complete control of citrus brown rot is obtained. The deposit is uniform and sticks well to the tree surfaces.

In similar operations finely-divided chloranil at 1 pound per 100 gallons is dispersed in an existent oil-water emulsion of high dilution, and in water. The emulsion immediately inverts to deposit the chloranil and oil on the surfaces of the spray tank and to clog the lines and spray nozzle. The dispersion in water is accomplished with sodium lauryl sulfate, but upon application of the resulting aqueous suspension to citrus infected with brown rot, a very low deposit of chloranil is obtained, most of the toxicant being lost in the run-off of the spray. Brown rot control is not accomplished under these conditions and with this amount of chloranil.

Other diseases of plants which may be controlled with aqueous dispersions of from 0.25 to 3 pounds of the new concentrate per 100 gallons of spray mixture include walnut blight (*Phytomonas juglandis*), powdery and downy mildew and other fungus diseases of truck crops, peach leaf curl (*Taphrina deformans*), citrus Anthracnose, brown rot of deciduous fruits (*Sclerotina sp.*), shot hole fungus, and apple and pear scab.

While the foregoing discussion has made particular reference to the use of petroleum oil in the preparation of the new compositions, it is to be understood that other oils may also be employed. Thus, any commercial agricultural oil of petroleum origin adapted for application to plants and trees can be used as described. Also vegetable and animal oils, such as cod-liver oil, sperm oil, castor oil, peanut oil, soybean oil, and the like, are suitable. Similarly, synthetic oils, such as long chain hydrocarbon mixtures, alpha-diphenyl-ethane, long chain olefines, etc., can be used.

We claim:

1. A method for the preparation of fungicide sprays which includes the steps of distributing from 0.5 to 3 per cent by weight of oil on finely-divided chloranil, and suspending this product in water in the amount of at least 0.25 pound of concentrate per 100 gallons of aqueous mixture and in the presence of the minimum amount of a wetting and dispersing agent required to accomplish dispersion of the oil-impregnated chloranil.

2. In the preparation of a chloranil-concentrate for use as the effective ingredient of aqueous fungicide sprays the step of distributing from 0.5 to 3.0 per cent by weight of oil on finely-divided chloranil.

3. A fungicide concentrate as a fine dust adapted to be dispersed in water to form agricultural spray compositions including from 0.5 to 3 per cent by weight of oil deposited on finely-divided chloranil.

4. A method for the preparation of fungicide sprays which includes the steps of distributing from 0.5 to 3 per cent by weight of oil on finely-divided chloranil, incorporating in this composition the minimum amount of a wetting and dispersing agent required to accomplish dispersion of the oil-impregnated chloranil in water, and suspending this product in water in the amount of at least 0.25 pound of concentrate per 100 gallons of aqueous mixture.

5. In the preparation of a chloranil-concentrate for use as the effective ingredient of aqueous fungicide sprays the steps of distributing from 0.5 to 3.0 per cent by weight of oil on finely-divided chloranil, and intimately mixing with the resulting composition the minimum amount of wetting agent sufficient to accomplish the dispersion of the composition in water.

6. A dust concentrate adapted to be dispersed in water to form agricultural fungicide spray compositions and consisting essentially of from 0.5 to 3.0 per cent by weight of oil deposited on finely-divided chloranil, and intimately mixed therewith the minimum amount of wetting agent required to accomplish the dispersion of the composition in water.

7. A method for the preparation of fungicide sprays which includes the steps of distributing from 0.5 to 3 per cent by weight of agricultural oil of petroleum origin of finely-divided chloranil and suspending this product in water in the amount of at least 0.25 pound of concentrate per 100 gallons of aqueous mixture and in the presence of the minimum amount of a wetting and dispersing agent required to accomplish dispersion of the oil-impregnated chloranil.

8. A fungicide concentrate as a fine dust adapted to be dispersed in water to form agricultural spray compositions including from 1.0 to 2.0 per cent by weight of an agricultural oil of petroleum origin deposited on finely-divided chloranil.

9. A dust concentrate adapted to be dispersed in water to form agricultural fungicide spray compositions and consisting essentially of from 0.5 to 3.0 per cent by weight of oil deposited on finely-divided chloranil and intimately mixed therewith from 0.2 per cent to 1.0 per cent of sodium lauryl sulfate.

JOHN FRANKLIN KAGY.
KENNETH D. SLOOP.

REFERENCES CITED

The following references are of record in the file of this patent:

UNITED STATES PATENTS

| Number | Name | Date |
|---|---|---|
| 2,283,275 | McLane | May 19, 1942 |
| 2,349,771 | Ter Horst | May 23, 1944 |